US012614675B2

(12) United States Patent
Park et al.

(10) Patent No.: US 12,614,675 B2
(45) Date of Patent: Apr. 28, 2026

(54) MULTILAYERED CAPACITOR AND METHOD FOR MANUFACTURING THE SAME

(71) Applicant: SAMSUNG ELECTRO-MECHANICS CO., LTD., Suwon-si (KR)

(72) Inventors: Seonho Park, Suwon-si (KR); Jaeseok Yi, Suwon-si (KR); Sunghyung Kang, Suwon-si (KR); Kunhoi Koo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 161 days.

(21) Appl. No.: 18/502,245

(22) Filed: Nov. 6, 2023

(65) Prior Publication Data

US 2024/0282530 A1 Aug. 22, 2024

(30) Foreign Application Priority Data

Feb. 21, 2023 (KR) ........................ 10-2023-0022609

(51) Int. Cl.
*H01G 4/232* (2006.01)
*H01G 4/008* (2006.01)
(Continued)

(52) U.S. Cl.
CPC ............. *H01G 4/2325* (2013.01); *H01G 4/30* (2013.01); *H01G 4/0085* (2013.01); *H01G 4/012* (2013.01); *H01G 4/1227* (2013.01)

(58) Field of Classification Search
CPC ...... H01G 4/2325; H01G 4/30; H01G 4/0085; H01G 4/012; H01G 4/1227
See application file for complete search history.

(56) References Cited

U.S. PATENT DOCUMENTS

2001/0017420 A1* 8/2001 Iwao ................... H01F 17/0013
257/693
2004/0072079 A1* 4/2004 Hashimoto ........... H01M 4/662
429/231.1
(Continued)

FOREIGN PATENT DOCUMENTS

JP 2001-250740 A 9/2001
JP 2021-089924 A 6/2021
(Continued)

OTHER PUBLICATIONS

The Extended European Search Report dated Jul. 31, 2024 issued in European Patent Application No. 23211947.9.

*Primary Examiner* — Michael P Mcfadden
(74) *Attorney, Agent, or Firm* — Morgan, Lewis & Bockius LLP

(57) ABSTRACT
A multilayered capacitor includes a capacitor body in which dielectric layers and internal electrodes are stacked in a first direction, and an external electrode disposed on the capacitor body. The external electrode includes a first layer including a first conductive metal, and a second layer disposed on the first layer and including an alloy of a second conductive metal and a low melting point metal having a melting point lower than that of the second conductive metal and having a plurality of pores, and an area ratio of pores in a unit area of the second layer to a unit area of the second layer is greater than or equal to about 30%.

16 Claims, 5 Drawing Sheets

(51) Int. Cl.
    *H01G 4/012*       (2006.01)
    *H01G 4/12*        (2006.01)
    *H01G 4/30*        (2006.01)

(56)            References Cited

U.S. PATENT DOCUMENTS

| | | |
|---|---|---|
| 2008/0130199 A1 | 6/2008 | Omura |
| 2011/0141657 A1 | 6/2011 | Jeon et al. |
| 2018/0108481 A1* | 4/2018 | Tomizawa ........... H01G 4/2325 |
| 2018/0166215 A1 | 6/2018 | Hamanaka et al. |
| 2019/0013150 A1 | 1/2019 | Koo et al. |
| 2020/0168400 A1* | 5/2020 | Nakamoto ............... H01G 4/30 |
| 2020/0411247 A1* | 12/2020 | Saruban .................... H01G 4/12 |
| 2021/0035736 A1* | 2/2021 | Cha .......................... H01G 4/30 |
| 2021/0343478 A1* | 11/2021 | Kojima ................. H01R 12/57 |
| 2022/0189696 A1* | 6/2022 | Yi .......................... H01G 4/232 |
| 2022/0208473 A1* | 6/2022 | Yun ........................ H01G 4/232 |

FOREIGN PATENT DOCUMENTS

| | | | |
|---|---|---|---|
| KR | 10-2011-0067509 A | 6/2011 | |
| KR | 10-2203372 B1 | 1/2021 | |
| KR | 10-2292798 B1 | 8/2021 | |

* cited by examiner

III

1322a

1322b

1322

1321a

1321

1321b

L

T

MULTILAYERED CAPACITOR AND METHOD FOR MANUFACTURING THE SAME

CROSS-REFERENCE TO RELATED APPLICATION

This application claims priority to and the benefit of Korean Patent Application No. 10-2023-0022609 filed in the Korean Intellectual Property Office on Feb. 21, 2023, the entire contents of which are incorporated herein by reference.

TECHNICAL FIELD

This disclosure relates to a multilayered capacitor and a method for manufacturing the same.

BACKGROUND

Multilayered ceramic capacitors (MLCCs) are being increasingly used not only in IT industries such as computers, communication devices, etc. but also in large-scale electronic equipment industries such as in automobiles, factories, etc. Accordingly, since the multilayered ceramic capacitors (MLCCs) are continuously required of stable and high-level characteristics, development of a multilayered capacitor simultaneously satisfying electrical characteristics and reliability is required.

SUMMARY

One aspect of the present disclosure provides a multilayered capacitor which exhibits improved bending strength characteristics by using an external electrode having a low elasticity coefficient to reduce a stress applied to the multilayered capacitor due to external mechanical deformation, has a low and stable equivalent series resistance (ESR), and in addition, since the external electrode includes no materials decomposed at a high temperature but materials no large thermal expansion difference, exhibits almost no shape change due to a temperature change and excellent heat resistance characteristics.

A multilayered capacitor according to one aspect includes a capacitor body in which dielectric layers and internal electrodes are stacked, and an external electrode disposed on the capacitor body. The external electrode includes a first layer disposed on the capacitor body and including a first conductive metal, and a second layer disposed on the first layer and including an alloy of a second conductive metal and a low melting point metal having a melting point lower than that of the second conductive metal and having a plurality of pores.

In a cross section in the first direction and a third direction from a center of the capacitor body in a second direction, an area ratio of pores in a unit area of the second layer to the unit area of the second layer is greater than or equal to about 30%. The second direction and the third direction is perpendicular to the first direction and perpendicular to each other.

In the cross section, the area ratio of pores in the unit area of the second layer to the unit area of the second layer may be about 40% to about 46%.

The first conductive metal and the second conductive metal may be the same metal.

The first conductive metal or the second conductive metal may include copper (Cu), nickel (Ni), silver (Ag), palladium (Pd), gold (Au), platinum (Pt), tungsten (W), titanium (Ti), an alloy thereof, or a combination thereof.

The low melting point metal may include tin (Sn), lead (Pb), bismuth (Bi), silver (Ag), copper (Cu), an alloy thereof, or a combination thereof.

The second layer may not include a resin.

The second layer may be composed of the alloy of the second conductive metal and the low melting point metal.

The alloy of the second conductive metal and the low melting point metal may include about 10 parts by weight to about 30 parts by weight of the low melting point metal based on 100 parts by weight of the second conductive metal. In the cross section, the second layer may further include a break portion, an island portion, or a combination thereof by the pores.

In the cross section, an average length of the second layer in the third direction may be about 20 $\mu$m to about 50 $\mu$m.

The first layer may further include glass.

In the cross section, an area ratio of pores in a unit area of the first layer to a unit area of the first layer may be less than or equal to about 3%.

The external electrode may further include a third layer disposed on the second layer.

The third layer may be a plating layer including nickel (Ni), copper (Cu), tin (Sn), palladium (Pd), platinum (Pt), gold (Au), silver (Ag), tungsten (W), titanium (Ti), lead (Pb), an alloy thereof, or a mixture thereof.

A method of manufacturing a multilayered capacitor according to another aspect includes preparing a capacitor body in which dielectric layers and internal electrodes are stacked, and forming an external electrode on of the capacitor body. The forming of the external electrode includes coating a first layer paste including a first conductive metal on the capacitor body and then sintering the first layer paste to form a first layer and coating a second layer paste including a second conductive metal and a low melting point metal having a lower melting point than the second conductive metal on the first layer and then sintering the second layer paste to form a second layer.

The first layer paste may further include glass frit.

The second layer paste may not further include a resin.

The second layer paste may include about 10 parts by weight to about 30 parts by weight of the low melting point metal based on 100 parts by weight of the second conductive metal.

The forming the external electrode may further include forming a third layer on the second layer by using a plating method.

The multilayered capacitor according to one aspect, since the external electrode has a low elasticity coefficient and thus reduces a stress applied to the multilayered capacitor due to external mechanical deformation, exhibits improved bending strength characteristics and low stable equivalent series resistance, and in addition, since the external electrode includes no materials decomposed at a high temperature but materials having no large thermal expansion difference, exhibits excellent heat resistance.

DETAILED DESCRIPTION OF THE EMBODIMENTS

Figure 1:
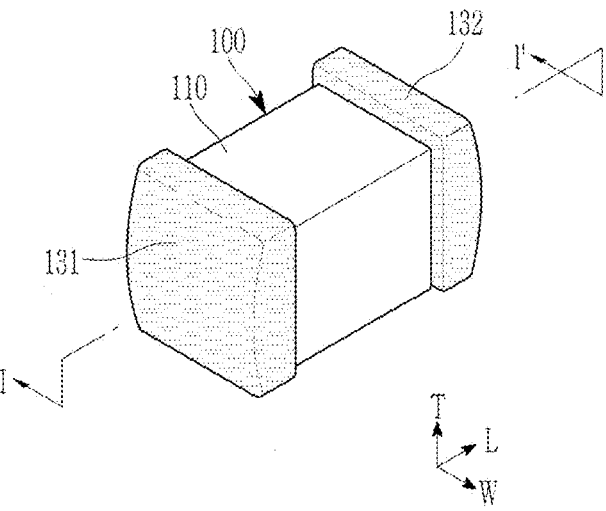
FIG. 1 is a perspective view illustrating a multilayered capacitor according to one aspect.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include," "comprise," "have," or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 2:
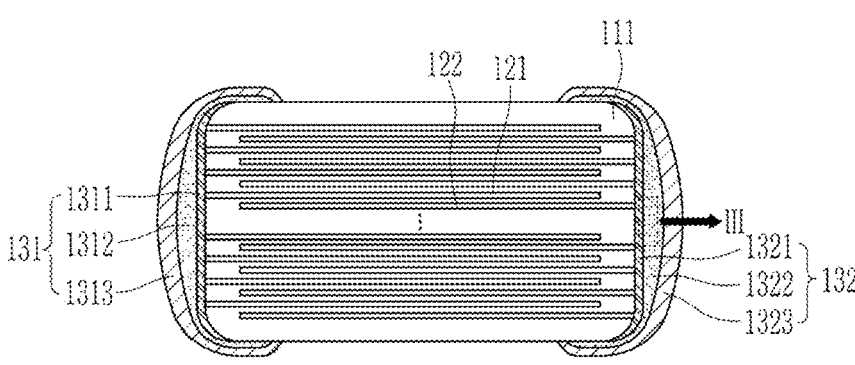
FIG. 2 is a cross-sectional view of the multilayered capacitor taken along line I-I' of FIG. 1.
Figure 2:
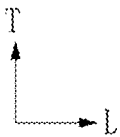
Figure 3:
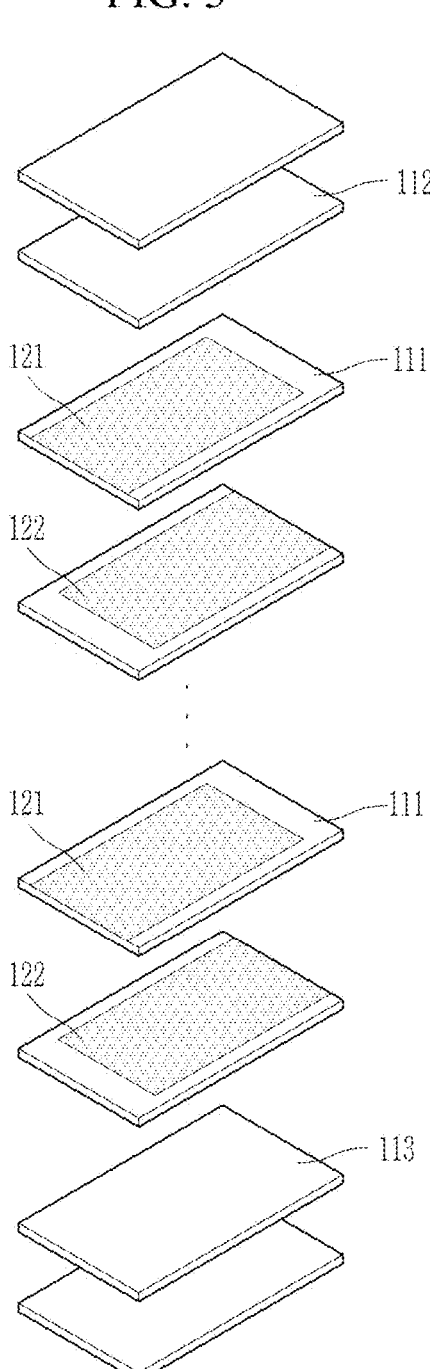
FIG. 3 is an exploded perspective view illustrating a stacked structure of internal electrodes in the capacitor body of FIG. 1.
Figure 3:
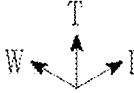

FIG. 1 is a perspective view illustrating a multilayered capacitor according to one aspect, FIG. 2 is a cross-sectional view of the multilayered capacitor taken along line I-I' of FIG. 1, and FIG. 3 is an exploded perspective view illustrating a stacked structure of internal electrodes in the capacitor body of FIG. 1.

When directions are defined to clearly describe the present aspect, the L-axis, W-axis, and T-axis indicated in the drawings represent the longitudinal direction, the width direction, and the thickness direction of the capacitor body 110, respectively. Herein, the thickness direction (T-axis direction) may be a direction perpendicular to the wide surface (main surface) of the sheet-shaped components, and may be, for example, used in the same concept as the stacking direction in which the dielectric layers 111 are stacked. The longitudinal direction (L-axis direction) may be a direction substantially perpendicular to the thickness direction (T-axis direction) in a direction extending parallel to the wide surface (main surface) of the sheet-shaped components, and may be, for example, a direction in which the first and second external electrodes 131 and 132 are disposed. The width direction (W-axis direction) may be a direction that extends parallel to the wide surface (main surface) of the sheet-shaped components and is substantially perpendicular to the thickness direction (T-axis direction), and the length of the sheet-like components in the longitudinal direction (L-axis direction) may be longer than the length in the width direction (W-axis direction).

Accordingly, the first direction, which is the direction in which the dielectric layer 111 and the first and second internal electrodes 121 and 122 are stacked, may be a thickness direction (T-axis direction), and the second and third directions perpendicular to the first direction and perpendicular to each other may be the longitudinal direction (L-axis direction) and width direction (W-axis direction) or the width direction (W-axis direction) and longitudinal direction (L-axis direction), respectively.

Referring to FIGS. 1 to 3, the multilayered capacitor 100 according to the present aspect may include the capacitor body 110, and first and second external electrodes 131 and 132 disposed at both ends of the capacitor body 110 which face each other in the longitudinal direction (L-axis direction).

The capacitor body 110 may have, for example, a substantially hexahedral shape.

In the present disclosure, for convenience of explanation, in the capacitor body 110, surfaces opposite to each other in the thickness direction (T-axis direction) are defined as first and second surfaces, surfaces connected to the first and second surfaces and facing each other in the longitudinal direction (L-axis direction) are defined as third and fourth surfaces, and surfaces connected to the first and second surfaces, connected to the third and fourth surfaces, and facing each other in the width direction (W-axis direction) are defined as fifth and sixth surfaces. For example, the first surface, which is a lower surface, may be a surface facing a mounting direction. In addition, the first to sixth surfaces may be flat, but the present disclosure is not limited thereto, for example, the first to sixth surfaces may be curved surfaces with a convex central portion, and an edge of each surface which is a boundary, may be round.

The shape and dimensions of the capacitor body 110 and the number of stacked dielectric layers 111 are not limited to those shown in the drawings of the present embodiment.

The capacitor body 110 is formed by stacking a plurality of the dielectric layers 111 in the thickness direction (T-axis direction) and then firing them, and includes a plurality of dielectric layers 111, and a plurality of first and second internal electrodes 121 and 122 which are alternately disposed in a thickness direction (T-axis direction) with the dielectric layers 111 interposed therebetween. In this case, the first and second internal electrodes 121 and 122 may have different polarities.

Herein, the boundary between the respective dielectric layers 111 adjacent to each other of the capacitor body 110 may be integrated to the extent that it is difficult to check without using a scanning electron microscope (SEM).

Also, the capacitor body 110 may include an active region and cover regions 112 and 113.

The active region contributes to generating a capacitance of the multilayered capacitor 100. For example, the active region may be a region in which the first and second internal electrodes 121 and 122 are stacked and overlapped with each other along the thickness direction (T-axis direction).

The cover regions 112 and 113 may be respectively disposed on the first and the second surfaces of the active region in the thickness direction (T-axis direction) as margin portions. The cover regions 112 and 113 may be formed by stacking a single dielectric layer 111 or two or more dielectric layers 111 on an upper surface and a lower surface of the active region, respectively.

In addition, the capacitor body 110 may further include a side cover region. The side cover region is a margin portion, and may be respectively disposed on the fifth and sixth surfaces of the active region in the width direction (W-axis direction). Such a side cover region may be formed by coating a conductive paste layer for forming an internal electrode only on a portion of the surface of the dielectric green sheet, stacking dielectric green sheets on which a conductive paste layer is not coated on both side surfaces of the dielectric green sheet, and firing the same.

The cover regions 112 and 113 and the side cover regions serve to prevent damage to the first and second internal electrodes 121 and 122 due to physical or chemical stress.

For example, the dielectric layer 111 may include a ceramic material having a high dielectric constant. For example, the ceramic material may include a dielectric ceramic containing components such as $BaTiO_3$, $CaTiO_3$, $SrTiO_3$, or $CaZrO_3$, and the like. In addition, auxiliary components such as a Mn compound, a Fe compound, a Cr compound, a Co compound, and a Ni compound may be further included in addition to these components. For example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, etc. are partially dissolved in $BaTiO_3$-based dielectric ceramics.

In addition, a ceramic powder, a ceramic additive, an organic solvent, a plasticizer, a binder, a dispersant, and the like may be further added to the dielectric layer 111. The ceramic additive may include, for example, transition metal oxide or transition metal carbide, a rare earth element, magnesium (Mg), or aluminum (Al), and the like.

For example, an average thickness of the dielectric layer 111 may be about 0.5 μm to about 10 μm. In one example, the term "about" may refer to a concept including a minute difference caused by a process error. For example, "about a value" may include not only a case of being "the value", but also a case of having a minute difference caused by a process error or a measurement, recognizable by one of ordinary skill in the art.

The first and second internal electrodes 121 and 122 are electrodes having different polarities, and are alternately disposed to face each other along the thickness direction (T-axis direction) with the dielectric layer 111 interposed therebetween, and one end thereof may be exposed through the third and fourth surfaces of the capacitor body 110.

The first and second internal electrodes 121 and 122 may be electrically insulated from each other by the dielectric layer 111 disposed therebetween.

Ends of the first and second internal electrodes 121 and 122 alternately exposed through the third and fourth surfaces of the capacitor body 110 are connected to the first and second external electrodes 131 and 132, respectively, to be electrically connected.

The first and second internal electrodes 121 and 122 may include a conductive metal, for example, a metal such as Ni, Cu, Ag, Pd, Au, or an alloy thereof, for example, an Ag—Pd alloy.

Also, the first and second internal electrodes 121 and 122 may include dielectric particles having the same composition as the ceramic material included in the dielectric layer 111.

The first and second internal electrodes 121 and 122 may be formed using a conductive paste containing a conductive metal. As a method of printing the conductive paste, a screen-printing method or a gravure printing method or the like may be used.

For example, each average thickness of the first and second internal electrodes 121 and 122 may be about 0.1 μm to about 2 μm.

The first and second external electrodes 131 and 132 are supplied with voltages of different polarities, and are electrically connected to exposed portions of the first and second internal electrodes 121 and 122, respectively.

According to the above configuration, when a predetermined voltage is applied to the first and second external electrodes 131 and 132, charges are accumulated between the first and second internal electrodes 121 and 122. At this time, a capacitance of the multilayered capacitor 100 is proportional to an overlapping area of the first and second internal electrodes 121 and 122 overlapping each other along the T-axis direction in the active region.

The first and second external electrodes 131 and 132 may respectively include first and second connection portions disposed on the third and fourth surfaces of the capacitor body 110 and connected to the first and second internal electrodes 121 and 122, and may also include first and second band portions disposed at each corner where the third and fourth surfaces of the capacitor body 110 and the first and second surfaces or the fifth and sixth surfaces thereof meet.

The first and second band portions may extend from the first and second connection portions to portions of the first and second surfaces or fifth and sixth surfaces of the capacitor body 110. The first and the second band portions may serve to improve adhesion strength of the first and second external electrodes 131 and 132.

Figure 4:
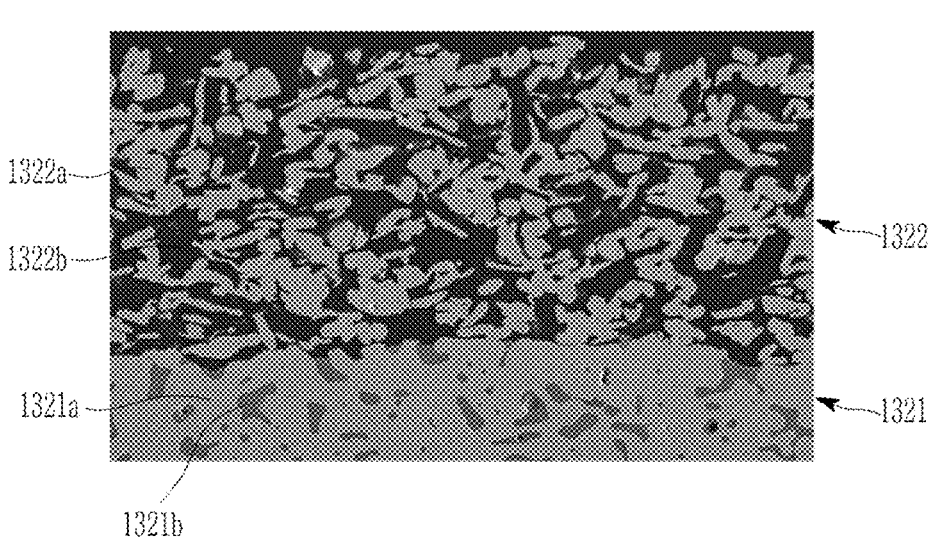
FIG. 4 is a scanning electron microscope (SEM) photograph of a region III of FIG. 2.
Figure 4:

FIG. 4 is a scanning electron microscope (SEM) photograph of a region III of FIG. 2. FIG. 4 shows the second external electrode 132 alone, but the first external electrode 131 also has similar characteristics to those of the second external electrode 132 shown in FIG. 4. Hereinafter, referring to FIG. 4, the first and second external electrodes 131 and 132 of the present aspect are illustrated in detail.

For example, the first and second external electrodes 131 and 132 may include the first layers 1311 and 1321 contacting the capacitor body 110, the second layers 1312 and 1322 disposed to cover the first layers 1311 and 1321, and optionally, the third layers 1313 and 1323 disposed to cover the second layers 1312 and 1322.

The first layers 1311 and 1321 may include a first conductive metal 1321a and optionally glass 1321b. For example, the first layers 1311 and 1321 may be sintered metal layers.

The first layers 1311 and 1321 may include copper (Cu), nickel (Ni), silver (Ag), palladium (Pd), gold (Au), platinum (Pt), tungsten (W), titanium (Ti), an alloy thereof, or a combination thereof as the first conductive metal 1321a, and for example, the copper (Cu) may include a copper (Cu) alloy. When the first conductive metal 1321a includes copper, the other metals excluding the copper may be included in an amount of less than or equal to about 5 parts by mole based on about 100 parts by mole of the copper.

For example, the first layers 1311 and 1321 may include a composition in which oxides are mixed as glass 1321b, and may include, for example, one or more selected from a silicon oxide, a boron oxide, an aluminum oxide, a transition metal oxide, an alkali metal oxide, and an alkali earth metal oxide. The transition metal may be one selected from the group consisting of zinc (Zn), titanium (Ti), copper (Cu), vanadium (V), manganese (Mn), iron (Fe), and nickel (Ni); the alkali metal may be one selected from the group consisting of lithium (Li), sodium (Na), and potassium (K); and the alkaline-earth metal may be one selected from the group consisting of magnesium (Mg), calcium (Ca), strontium (Sr), and barium (Ba).

Hereinafter, the first layers 1311 and 1321 and the second layers 1312 and 1322 are analyzed with respect to an average length, an average area, and an average area and a type of each component, etc. by examining a cross-section of the multilayered capacitor 100 cut at the center of the width direction (W-axis direction) (½ point) in the longitudinal direction and the stacking direction perpendicular to the width direction (W-axis direction) (L-axis direction and T-axis direction cross-section) or cut at the center of the longitudinal direction (L-axis direction) (½ point) in the width direction (W-axis direction) and the stacking direction (T-axis direction) perpendicular to the longitudinal direction (L-axis direction) (hereinafter, referred to as "cross-section") with a scanning electron microscope (SEM), a scanning transmission electron microscope (STEM), or the like. In addition, the measurement may be performed at at least three, five, or ten different points or on the cross-section, and an arithmetic mean thereof may be calculated.

A cross-section sample of the multilayered capacitor 100 may be, for example, prepared by mounting the multilayered capacitor 100 in an epoxy mold, polishing the multilayered capacitor 100 to expose its cross-section, and coating it with a Pt coater for 10 seconds.

The scanning electron microscope (SEM) may be, for example, a Verios G4 product made by ThermoFisher Scientific Inc., which is used under conditions of 10 KV at an analysis magnification of about 3000 times to secure an image of the first and second external electrodes 131 and 132 from an interface of the first and second external electrodes 131 and 132 and the dielectric layer 111 to about 70 μm in an outward direction.

In addition, the first conductive metal 1321a and the glass 1321b of the first layers 1311 and 1321 and the alloy 1322a of the second conductive metal and the low melting point metal and the pore 1322b of the second layers 1312 and 1322 are measured with respect to average area, components, etc. by examining the cross-section photograph taken with SEM, STEM, or the like by using an electron beam microanalyzer (EPMA). When the component analysis is performed with an electron beam microanalyzer (EPMA), an energy dispersive spectroscope (EDS), or a wavelength dispersive spectroscope (WDS), as an X-ray spectrometer may be used. Alternatively, when the cross-section of the first and second external electrodes 131 and 132 is examined through a reflection electron image of SEM or an HAADF image of STEM, the first conductive metal 1321a having a metallic bond and an alloy 1322a of the second conductive metal and the low melting point metal may be recognized as a bright portion of contrast, and non-metal components such as the glass 1321b, the pore 1322b, and the like may be recognized as a dark portion of the contrast. Accordingly, the average areas of the first conductive metal 1321a and the glass 1321b of the first layers 1311 and 1321, the alloy 1322a of the second conductive metal and the low melting point metal and the pore 1322b of the second layers 1312 and 1322, and the like may be obtained by binarizing the cross-section photograph and the like to calculate a ratio of an area of a portion with a different contrast to that of the entire measurement field of view. In addition, the measurement may be performed at at least three, five, or ten different points or on the cross-section, and an arithmetic mean thereof may be calculated.

In the first layers 1311 and 1321, each content of the first conductive metal 1321a and the glass 1321b are not particularly limited, but in the cross-section, an area ratio of the first conductive metal 1321a to a unit area of the first layers 1311 and 1321 may be, for example, about 30% to about 90% or about 70% to about 90%.

The first layers 1311 and 1321 may have almost no pores.

Herein, an area ratio of the pores of the first layers 1311 and 1321 may be a percentage (%) of the area of the pores in the unit area of the first layers 1311 and 1321 to the unit area of the first layers 1311 and 1321.

In addition, in the SEM or STEM cross-section photograph, etc., an area ratio of pores of the first layers 1311 and 1321 may be measured in a unit area of a width of about 1 μm to about 100 μm and a length of about 1 μm to about 100 μm, for example, about 10 μm×about 2 μm in the first layers 1311 and 1321. The unit area may be disposed at any position in the first layers 1311 and 1321, for example, the first and second connection portions of the first layers 1311 and 1321, the first and second band portions, and the edges therebetween. However, all of the unit area must be positioned within the first layers 1311 and 1321. An area ratio of the pores may be an arithmetic mean of the area ratios of a plurality of unit areas within the first layers 1311 and 1321, for example, an arithmetic mean of the area ratios of the pores measured in the unit areas positioned at the first and second connection portions of the first layers 1311 and 1321, the first and second band portions, and the edges therebetween.

For example, in the cross-section, an area ratio of the pores in the unit area of the first layers 1311 and 1321 to the unit area of the first layers 1311 and 1321 may be less than or equal to about 3% or about 1% to about 3%. When the area ratio of the pores in the unit area of the first layers 1311 and 1321 is greater than about 3%, moisture resistance reliability may be deteriorated.

The second layers 1312 and 1322 are formed on the first layers 1311 and 1321, for example, to completely cover the first layers 1311 and 1321.

The second layers 1312 and 1322 extend to the first and second surfaces or fifth and sixth surfaces of the capacitor body 110, and a region (i.e., band portion) in which the second layers 1312 and 1322 extend to the first and second surfaces or fifth and sixth surfaces of the capacitor body 110 may be longer than that of a region (i.e., band portion) in which the first layers 1311 and 1321 extend to the first and second surfaces or fifth and sixth surfaces of the capacitor body 110. In other word, the second layers 1312 and 1322 are formed on the first layers 1311 and 1321 to completely cover the first layers 1311 and 1321.

The second layers 1312 and 1322 include the alloy 1322a of the second conductive metal and the low melting point metal. The low melting point metal has a lower melting point than the second conductive metal.

The alloy 1322a of the second conductive metal and the low melting point metal included in the second layers 1312 and 1322 may serve to electrically connect the second layers 1312 and 1322 with the first layers 1311 and 1321 or the third layers 1313 and 1323.

For example, the second conductive metal may include copper (Cu), nickel (Ni), silver (Ag), palladium (Pd), gold (Au), platinum (Pt), tungsten (W), titanium (Ti), an alloy thereof, or a combination thereof. The first conductive metal 1321*a* and the second conductive metal may be the same metal.

The low melting point metal may include any metal having a lower melting point than the second conductive metal without limitation, for example tin (Sn), lead (Pb), bismuth (Bi), silver (Ag), copper (Cu), an alloy thereof, or a combination thereof. However, indium (In) etc., which are commonly used as the low melting point metal, have too low a melting point and may exhibit instability, but lead (Pb) may be difficult to use due environmental reasons. For example, when the second conductive metal is copper (Cu), and the low melting point metal is tin (Sn), the alloy 1322*a* of the second conductive metal and the low melting point metal may be, for example, $Cu_6Sn_5$ or $Cu_3Sn$, but when the low melting point metal is tin (Sn) and silver (Ag), the alloy 1322*a* of the second conductive metal and the low melting point metal may be, for example, SnAg—Cu, and when the second conductive metal is silver (Ag), and the low melting point metal is tin (Sn), the alloy 1322*a* of the second conductive metal and the low melting point metal may be, for example, $Ag_3Sn$.

The alloy of the second conductive metal and the low melting point metal 1322*a* may include about 10 parts by weight to about 30 parts by weight of the low melting point metal based on 100 parts by weight of the second conductive metal. When the alloy of the second conductive metal and the low melting point metal 1322*a* includes less than about 10 parts by weight of the low melting point metal based on about 100 parts by weight of the second conductive metal, bonding strength between the second conductive metals may be deteriorated, but when the low melting point metal is included in an amount of greater than about 30 parts by weight, the low melting point metal may not serve to connect the second conductive metals but rather stick together itself, so that pores may rather disappear.

The second layers 1312 and 1322 may be formed only of the alloy 1322*a* of the second conductive metal and the low melting point metal, for example, include further no resin. In other words, the first and second external electrodes 131 and 132 includes no conductive resin layer including a resin and a conductive metal.

When the first layers 1311 and 1321 alone are formed into the first and second external electrodes 131 and 132, since the first layers 1311 and 1321 are relatively vulnerable to external mechanical stress due to a low elasticity coefficient, the conductive resin layer including a mixture of a resin such as an epoxy resin having sufficient ductility and the like and conductive metal particles is introduced. However, when the conductive resin layer is introduced, there is a problem that equivalent series resistance (ESR) is relatively higher and more scattered. In addition, since the epoxy resin is more vulnerable to heat than the other metals and ceramic materials applied to the multilayered capacitor 100, when exposed to a high temperature environment, the epoxy resin may be decomposed or expand to cause lifting, more scattering ESR.

In this aspect, the second layers 1312 and 1322 include no resin such as the epoxy resin and the like. Accordingly, the first and second external electrodes 131 and 132 have stable ESR and include no materials decomposed at a high temperature but materials having no large thermal expansion difference and thus exhibit almost no shape change according to a temperature change and excellent heat resistance characteristics.

Instead, the second layers 1312 and 1322 have a plurality of pores 1322*b*. The porous structure of the second layers

1312 and 1322 may lower an elasticity coefficient of the first and second external electrodes 131 and 132 and thus reduce stress applied to the multilayered capacitor 100 due to external mechanical deformation, thereby improving bending strength characteristics.

For example, in the cross-section, the area ratio of the pores 1322*b* in a unit area of the second layers 1312 and 1322 to the unit area of the second layers 1312 and 1322 may be greater than or equal to about 30%, for example, about 40% to about 46%. When the area ratio of the pores 1322*b* of the unit area of the second layers 1312 and 1322 is less than about 30%, the Young's modulus increases, which may weaken bending strength.

Herein, the area ratio of the pores 1322*b* of the second layers 1312 and 1322 may be a percentage (%) of an area of the pores 1322*b* in the unit area of the second layers 1312 and 1322 to the unit area of the second layers 1312 and 1322.

In addition, the area ratio of the pores 1322*b* in the second layers 1312 and 1322 may be measured, in the cross-section photograph of SEM, STEM, or the like, within a unit area of a width of about 1 μm to about 100 μm and a length of about 1 μm to about 100 μm, for example, about 10 μm×about 2 μm in the second layers 1312 and 1322. The unit area may be positioned at any position within the second layers 1312 and 1322, for example, the first and second connection portions of the second layers 1312 and 1322, the second band portions, and the edges therebetween. However, all of the unit area must be positioned within the second layers 1312 and 1322. The area ratio of the pores 1322*b* may be an arithmetic mean of the area ratios of the pores 1322*b* in a plurality of unit areas in the second layers 1312 and 1322, for example, the first and second connection portions of the second layers 1312 and 1322, the first and second band portions, and the edges therebetween.

In the cross-section, the second layers 1312 and 1322 may further include a disconnected portion, an island portion, or a combination thereof by the pores 1322*b*. Herein, the pores 1322*b* may be spaces between the alloys 1322*a* of the second conductive metal and the low melting point metal, in which the alloys 1322*a* of the second conductive metal and the low melting point metal are disposed at intervals, wherein the disconnected portion may be a portion in which the alloys 1322*a* of the second conductive metal and the low melting point metal are not disposed all over the entire thickness of the second layers 1312 and 1322, the island portion may be a set of the alloys 1322*a* of the second conductive metal and the low melting point metal located between the pore 1322*b* and the pore 1322*b*, between the disconnected portion and the disconnected portion, or between the pore 1322*b* and the disconnected portion.

A longitudinal direction (L-axis direction) average length of the second layers 1312 and 1322 in the first and second connection portions, that is, an average thickness may be about 20 μm to about 50 μm. In addition, in the first and second band portions, a thickness direction (W-axis direction) average length of the second layers 1312 and 1322, that is, an average thickness need not to be particularly limited. However, in order to secure sufficient bending strength characteristics, in the first and second band portions, the thickness direction (W-axis direction) average length, that is, the average thickness of the second layers 1312 and 1322 may be about 10 μm to about 20 μm. The thicker average thickness of the second layers 1312 and 1322, the better bending strength, but when the average thickness is thinner than the above range, the second layers 1312 and 1322 may not well endure bending stress and thus have weak bending strength.

Optionally, the first and second external electrodes 131 and 132 may further include third layers 1313 and 1323 outside the second layers 1312 and 1322.

The third layers 1313 and 1323 may be a plating layer including nickel (Ni), copper (Cu), tin (Sn), palladium (Pd), platinum (Pt), gold (Au), silver (Ag), tungsten (W), titanium (Ti), or lead (Pb) alone or an alloy thereof. For example, the third layers 1313 and 1323 may be a nickel (Ni) plating layer or a tin (Sn) plating layer, and may have a form in which a nickel (Ni) plating layer and a tin (Sn) plating layer are sequentially stacked, or a tin (Sn) plating layer, a nickel (Ni) plating layer, and a tin (Sn) plating layer are sequentially stacked. Also, the third layers 1313 and 1323 may include a plurality of nickel (Ni) plating layers and/or a plurality of tin (Sn) plating layers.

The third layers 1313 and 1323 may improve mountability of the multilayered capacitor 100 with a board, structural reliability, external durability, heat resistance, and equivalent series resistance (ESR).

A method of manufacturing a multilayered capacitor according to another aspect includes preparing a capacitor body in which dielectric layers and internal electrodes are stacked, and forming an external electrode outside the capacitor body.

First, the manufacturing of the capacitor body is described. In the manufacturing process of the capacitor body, a dielectric paste to become the dielectric layer after firing and a conductive paste to become the internal electrode after firing are prepared.

The dielectric paste is prepared, for example, by the following method. Ceramic materials are uniformly mixed by means such as wet mixing, dried, and heat-treated under predetermined conditions to obtain calcined powder. To the obtained calcined powder, an organic vehicle or an aqueous vehicle is added and kneaded to prepare a dielectric paste.

A dielectric green sheet is obtained by forming the obtained dielectric paste into a sheet by a doctor blade method or the like. In addition, the dielectric paste may include an additive selected from various dispersants, plasticizers, dielectrics, subcomponent compounds, or glass as needed.

Conductive paste for the internal electrode is prepared by kneading conductive powder made of a conductive metal or an alloy thereof with a binder or a solvent. The conductive paste for the internal electrode may include ceramic powder (for example, barium titanate powder) as a co-material, if necessary. The co-material may act to suppress sintering of the conductive powder during the firing process.

On the surface of the dielectric green sheet, the conductive paste for an internal electrode is coated in a predetermined pattern by various printing methods such as screen printing or a transfer method. After stacking a plurality of layers of dielectric green sheets on which internal electrode patterns are formed, a dielectric green sheet stack is obtained by pressing in the stacking direction. At this time, the dielectric green sheets and internal electrode patterns may be stacked so that the dielectric green sheets may be disposed on the upper and lower surfaces of the dielectric green sheet stack in the stacking direction.

Optionally, the obtained dielectric green sheet stack may be cut into predetermined dimensions by dicing or the like.

In addition, the dielectric green sheet stack may be solidified and dried to remove the plasticizer, etc. and barrel-polished by using a centrifugal barrel machine or the like after the solidification-drying. In the barrel polishing, the dielectric green sheet stack is put with a medium and a polishing liquid into a barrel container, and then the barrel container is applied with rotational motion or vibration to polish unnecessary parts such as burrs and the like generated during the cutting. In addition, after the barrel polishing, the dielectric green sheet stack is washed with a cleaning solution such as water and the like and dried.

The dielectric green sheet stack is treated to remove the binder and fired, obtaining the capacitor body.

The binder removal may be performed under conditions appropriately adjusted according to a main component composition of the dielectric layer or a main component composition of the internal electrode. For example, the binder removal may be performed by increasing a temperature at about 5° C./hr to about 300° C./hr and maintaining about 180° C. to about 400° C. for about 0.5 hours to about 24 hours. The binder removal may be performed under an air atmosphere or a reducing atmosphere.

The firing treatment may be performed under conditions appropriately adjusted according to the main component composition of the dielectric layer or the main component composition of the internal electrode. For example, the firing may be performed at about 1200° C. to about 1350° C. or about 1220° C. to about 1300° C. for about 0.5 hours to about 8 hours or about 1 hour to about 3 hours. The firing may be performed under a reducing atmosphere, for example, an atmosphere in which a mixed gas of nitrogen gas ($N_2$) and hydrogen gas ($H_2$) is humidified. When the internal electrode includes nickel (Ni) or a nickel (Ni) alloy, an oxygen partial pressure may be about $1.0 \times 10^{-14}$ MPa to about $1.0 \times 10^{-10}$ MPa under the firing atmosphere.

After the firing treatment, annealing may be performed, if needed. The annealing is performed for re-oxidizing the dielectric layer, and when the firing is performed under a reducing atmosphere, the annealing may be performed. The annealing may be performed under conditions appropriately adjusted according to the main component composition and the like of the dielectric layer. For example, the annealing may be performed at about 950° C. to about 1150° C. for about 1 min to about 20 hours by increasing the temperature at about 50° C./hour to about 500° C./hour. The annealing may be performed under a humid nitrogen gas ($N_2$) atmosphere, wherein an oxygen partial pressure may be about $1.0 \times 10^{-9}$ MPa to about $1.0 \times 10^{-5}$ MPa.

In the binder removal treatment, the firing treatment, or the annealing treatment, in order to humidify nitrogen gas, mixed gas, or the like, a wetter or the like may be for example, used, wherein a water temperature may be about 5° C. to about 75° C. The binder removal treatment, the firing treatment, and the annealing treatment may be performed continuously or independently.

Optionally, the third and fourth surfaces of the obtained capacitor body may be surface-treated through sandblasting, laser irradiation, barrel polishing, or the like. This surface treatment may expose the ends of the first and second internal electrodes on the outer surfaces of the third and fourth surfaces, thereby improving the electrical connection of the first and second external electrodes and the first and second internal electrodes and easily forming the alloy portion.

On the outer surface of the capacitor body, a first layer paste may be coated and sintered to form a first layer.

The first layer paste may include a first conductive metal and optionally glass frit. The first conductive metal and glass frit are the same as above and will not be repeatedly illustrated. In addition, the first layer paste may optionally include a subcomponent such as a binder, a solvent, a dispersant, a plasticizer, or oxide powder. For example, the binder may include ethyl cellulose, acryl, butyral, or the like, and the solvent may use an organic solvent such as terpineol, butyl carbitol, alcohol, methylethylketone, acetone, or toluene, or an aqueous solvent.

A method of coating the first layer paste on the outer surface of the capacitor body may include various printing methods such as a dip method, or screen printing, and the like, a coating method by using a dispenser, a spray method by using a spray, and the like. The first layer paste may be coated on at least the third and fourth surfaces of the capacitor body and optionally, on portions of the first surface, second surface, the fifth surface, or the sixth surface where the band portions of the first and second external electrodes are formed.

Subsequently, the capacitor body on which the first layer paste is coated is dried and then sintered at a temperature of about 700° C. to about 1000° C. for 0.1 hour to 3 hours to form a first layer.

On the outer surface of the obtained capacitor body, a second layer paste is coated and cured to form a second layer.

The second layer paste may include a second conductive metal and a low melting point metal having a lower melting point than the second conductive metal. The second conductive metal and the low melting point metal are the same as above and will not be repeatedly illustrated. In addition, the second layer paste may optionally include a subcomponent such as a binder, a solvent, a dispersant, a plasticizer, or oxide powder. For example, the binder may include ethyl cellulose, acryl, butyral, or the like, and the solvent may use an organic solvent such as terpineol, butyl carbitol, alcohol, methylethylketone, acetone, or toluene, and the like or an aqueous solvent. On the other hand, the paste for the second layer may not further include a resin, and the resin may be, for example, a phenol resin, an acrylic resin, a silicone resin, an epoxy resin, or a polyimide resin.

The second layer paste may include about 10 parts by weight to about 30 parts by weight of the low melting point metal based on 100 parts by weight of the second conductive metal. When the second layer paste includes less than about 10 parts by weight of the low melting point metal based on about 100 parts by weight of the second conductive metal, bonding strength between the second conductive metals may decrease, but when the second layer paste includes greater than about 30 parts by weight, the low melting point metal may not serve to connect the second conductive metals but stick together itself, so that pores may rather disappear.

A method of coating the second layer paste on the outer surface of the capacitor body may include various printing methods such as a dip method, or screen printing, and the like, a coating method by using a dispenser, a spray method by using a spray, and the like. The second layer paste may be coated on at least the third and fourth surfaces of the capacitor body and optionally, on portions of the first surface, second surface, the fifth surface, or the sixth surface where the band portions of the first and second external electrodes are formed.

Subsequently, the capacitor body on which the second layer paste is coated is dried and then sintered at a temperature of about 700° C. to about 1000° C. for 0.1 hour to 3 hours to form a second layer.

For example, when the second conductive metal is copper (Cu), and the low melting point metal is tin (Sn), the tin (Sn) having a relatively low melting point during the sintering process is first liquefied to wet the copper (Cu) particles and thus form an alloy, which allows the sintering to be completed without being completely dense, the second layer includes the alloy of the second conductive metal and the low melting point metal and have a plurality of pores.

Optionally, a third layer is formed outside the second layer.

For example, the third layer may be formed by a plating method, or may be formed by sputtering or electroplating (electric deposition).

Hereinafter, specific embodiments of the invention are presented. However, the examples described below are only for specifically illustrating or explaining the invention, and the scope of the invention is not limited thereto. [Preparation Examples: Manufacturing of Multilayered Capacitor]

EXAMPLE

A paste including barium titanite (BaTiO$_3$) powder is coated on a carrier film and then dried, manufacturing a plurality of dielectric green sheets.

A conductive paste including nickel (Ni) is screen-printed on each dielectric green sheet to form a conductive paste layer.

A dielectric green sheet stack is manufactured by stacking the plurality of dielectric green sheets, while at least each portion of the conductive paste layers thereon is overlapped.

The dielectric green sheet stack is cut into individual chips, which are maintained under an air atmosphere at 230° C. for 60 hours to remove a binder and then fired at 1200° C., manufacturing a capacitor body.

Subsequently, a first layer paste including a glass frit and copper (Cu) as the first conductive metal is coated on the outer surface of the capacitor body in a dip coating method and then dried and sintered to form a first layer.

Then, a second layer paste including copper (Cu) as the second conductive metal and tin (Sn) as the low melting point metal is coated on the outer surface of the capacitor body and then dried and sintered to form a second layer.

Subsequently, nickel (Ni) and tin (Sn) are plated thereon, manufacturing a multilayered capacitor.

Comparative Example

A paste including barium titanite (BaTiO$_3$) powder is coated on a carrier film and then dried, manufacturing a plurality of dielectric green sheets.

A conductive paste including nickel (Ni) is screen-printed on each dielectric green sheet to form a conductive paste layer.

A dielectric green sheet stack is manufactured by stacking the plurality of dielectric green sheets, while at least each portion of the conductive paste layers thereon is overlapped.

The dielectric green sheet stack is cut into individual chips, which are maintained under an air atmosphere at 230° C. for 60 hours to remove a binder and then fired at 1200° C., manufacturing a capacitor body.

Subsequently, a first layer paste including glass and copper (Cu) as a conductive metal is coated on the outer surface of the capacitor body in a dip coating method and then dried and sintered to form a first layer.

Then, a paste for a conductive resin layer including an epoxy resin and copper (Cu) powder as a conductive metal is coated on the outer surface of the capacitor body and then dried and cured to form a conductive resin layer.

On the capacitor body having the conductive resin layer, nickel (Ni) and tin (Sn) are plated, manufacturing a multilayered capacitor.

Experimental Example 1: Analysis of Formation of Metal Layer

The multilayered capacitors according to the examples and the comparative examples are measured with respect to pore areas and equivalent series resistance (ESR).

1) Measurement Method of Pore Area

Five of each of the multilayered capacitors are mounted in an epoxy mold, and after polishing the L-axis direction and T-axis direction surfaces (e.g., fifth surface) thereof to about ½ of a depth along the W-axis direction, a Pt coater is used to coat them for 10 seconds, preparing cross-section samples.

In the prepared cross-section samples, a place where the first or second electrode is all visible from the interface of the first or second external electrode with the dielectric layer to 70 μm or so in the third layer direction is measured with UHR-SEM (Scanning Electron Microscope) at an acceleration voltage of 10 kV, an analysis magnification of 3000 times, that is, at a magnification that the interface of the first and second layers and a porous structure of the second layer are visible.

2) Measurement Method of Bending Strength

Thirty of each of the multilayered capacitors according to the examples and the comparative examples are prepared. The multilayered capacitors are mounted (soldered) on a printed circuit board (PCB) and fixed thereinto through reflow.

Bending strength is measured by using a bending strength measuring equipment, for example, TT28025S manufactured by Tira GmbH, Keithely 6485*4, Keithely 6487*1.

The bending strength is measured through a three-point bending experiment by placing the board with each multilayered capacitor in the middle between two supports spaced 90 mm apart and connecting it to the measuring equipment to evaluate initial charge charging and measure a leakage current during the evaluation. When the connection is completed, the bending strength measuring equipment is used to press the board and bend it and simultaneously, check whether charges charged in the multilayered capacitor are leaked or not, when the board is 3 mm pressed. Subsequently, a cross-section of the multilayered capacitor is examined to determine whether it is a failure or not.

3) Measurement Method of Equivalent Series Resistance (ESR)

Two hundreds of each of the multilayered capacitors according to the examples and the comparative examples are prepared. The multilayered capacitors are respectively mounted (soldered) on a printed circuit board and once to three times put in a reflow facility at a peak temperature of 290° C. The reflowed board is put in an impedance analyzer equipment to measure ESR in a temperature frequency environment of 1 MHz.

The ESR measurement equipment may be, for example, an impedance analyzer made by JK Tech.

The multilayered capacitors according to the examples are measured with respect to a pore area in the second layer, and the results are shown in Table 1. In addition, FIG. 4 is a scanning electron microscope (SEM) image showing the second layer of the multilayered capacitor according to the examples.

TABLE 1

| Porosity | Example |
| --- | --- |
| Average | 43.71 |
| Standard deviation (STDEV) | 1.00 |

TABLE 1-continued

| Porosity | Example |
| --- | --- |
| Minimum value (Min) | 42.78 |
| Maximum value (Max) | 45.16 |

Referring to Table 1 and FIG. 4, the second layer of the multilayered capacitor according to examples turns out to have a pore area of 43.71%.

In addition, the bending strength results of the multilayered capacitors according to the examples and the comparative examples are shown in Table 2.

TABLE 2

| 3 mm bending strength | Comparative Example | Example |
| --- | --- | --- |
| Number of failures | 0/30 | 0/30 |
| Failure rate (%) | 0 | 0 |

Referring to Table 2, the multilayered capacitors according to the examples and the comparative examples secure appropriate bending strength without defects, which all turn out to be equivalent.

In addition, the equivalent series resistance (ESR) results of the multilayered capacitors according to the examples and the comparative examples are shown in Table 3.

TABLE 3

| | ESR (mΩ) | | | |
| --- | --- | --- | --- | --- |
| | Example | | Comparative Example | |
| Reflow recover | Once | Three times | Once | Three times |
| Average | 1.99 | 2.00 | 8.34 | 9.66 |
| Minimum value (Min) | 1.46 | 1.44 | 4.95 | 6.04 |
| Maximum value (Max) | 4.48 | 4.53 | 22.89 | 21.97 |
| Standard deviation (STDEV) | 0.244 | 0.258 | 1.693 | 1.754 |

Referring to Table 3, the multilayered capacitors according to the examples exhibit initial ESR of 25%, which is very lower than that of the multilayered capacitors according to the comparative examples, and a very small ESR change of 0.5% after two additional reflow heat treatments, compared with 15.8% of a high variation rate of the multilayered capacitors of the comparative examples having the conductive resin layers to which an epoxy resin is applied.

Figure 5:
FIG. 5 is a scanning electron microscope (SEM) photograph of the external electrode of the multilayered capacitor manufactured in comparative example.

In addition, FIG. 5 shows a scanning electron microscope image of a cross-section of the multilayered capacitor of the comparative examples which exhibits an increase in ESR after three times reflows. Referring to FIG. 5, an interface between the first layer and the conductive resin layer is lifted. In FIG. 5, a region inside a red dotted line is where the lifting occurs. This phenomenon may not be found in the multilayered capacitors according to the examples.

The multilayered capacitors according to the examples exhibit no two possible deteriorations in a high temperature environment, that is, no defective lifting of the interface between the first layer and the conductive resin layer and no ESR change.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A multilayered capacitor, comprising:
a capacitor body in which dielectric layers and internal electrodes are stacked in a first direction, and
an external electrode disposed on the capacitor body,
wherein the external electrode includes:
a first layer disposed on the capacitor body and including a first conductive metal, and
a second layer disposed on the first layer and including an alloy of a second conductive metal and a low melting point metal having a melting point lower than that of the second conductive metal and having a plurality of pores, and
in a cross section in the first direction and a third direction from a center of the capacitor body in a second direction, an area ratio of pores in a unit area of the second layer to the unit area of the second layer is greater than or equal to about 30% and a remaining portion other than the pores in the unit area includes only the alloy, the second direction and the third direction being perpendicular to the first direction and being perpendicular to each other.

2. The multilayered capacitor of claim 1, wherein in the cross section, the area ratio of pores in the unit area of the second layer to the unit area of the second layer is about 40% to about 46%.

3. The multilayered capacitor of claim 1, wherein the first conductive metal and the second conductive metal are the same metal.

4. The multilayered capacitor of claim 1, wherein the first conductive metal or the second conductive metal includes copper (Cu), nickel (Ni), silver (Ag), palladium (Pd), gold (Au), platinum (Pt), tungsten (W), titanium (Ti), an alloy thereof, or a combination thereof.

5. The multilayered capacitor of claim 1, wherein the low melting point metal includes tin (Sn), lead (Pb), bismuth (Bi), silver (Ag), copper (Cu), an alloy thereof, or a combination thereof.

6. The multilayered capacitor of claim 1, wherein the alloy of the second conductive metal and the low melting point metal includes about 10 parts by weight to about 30 parts by weight of the low melting point metal based on 100 parts by weight of the second conductive metal.

7. The multilayered capacitor of claim 1, wherein in the cross section, the second layer further includes a break portion, an island portion, or a combination thereof by the pores.

8. The multilayered capacitor of claim 1, wherein in the cross section, an average length of the second layer in the third direction is about 20 um to about 50 um.

9. The multilayered capacitor of claim 1, wherein the first layer further includes glass.

10. The multilayered capacitor of claim 1, wherein in the cross section, an area ratio of pores in a unit area of the first layer to the unit area of the first layer is less than or equal to about 3%.

11. The multilayered capacitor of claim 1, wherein the external electrode further includes a third layer disposed on the second layer.

12. The multilayered capacitor of claim 11, wherein the third layer includes a plating layer including nickel (Ni), copper (Cu), tin (Sn), palladium (Pd), platinum (Pt), gold (Au), silver (Ag), tungsten (W), titanium (Ti), lead (Pb), an alloy thereof, or a mixture thereof.

13. A method of manufacturing a multilayered capacitor, comprising:
preparing a capacitor body in which dielectric layers and internal electrodes are stacked in a first direction, and
forming an external electrode on of the capacitor body,
wherein the forming of the external electrode includes:
coating a first layer paste including a first conductive metal on the capacitor body and then sintering the first layer paste to form a first layer, and
coating a second layer paste including a second conductive metal and a low melting point metal having a lower melting point than the second conductive metal on the first layer and then sintering the second layer paste to form a second layer, and
wherein the external electrode includes:
the first layer disposed on the capacitor body and including the first conductive metal, and
the second layer disposed on the first layer and including an alloy of the second conductive metal and the low melting point metal and having a plurality of pores, and
in a cross section in the first direction and a third direction from a center of the capacitor body in a second direction, an area ratio of pores in a unit area of the second layer to the unit area of the second layer is greater than or equal to about 30% and a remaining portion other than the pores in the unit area includes only the alloy, the second direction and the third direction being perpendicular to the first direction and being perpendicular to each other.

14. The method of claim 13, wherein the first layer paste further includes glass frit.

15. The method of claim 13, wherein the second layer paste includes about 10 parts by weight to about 30 parts by weight of the low melting point metal based on 100 parts by weight of the second conductive metal.

16. The method of claim 13, wherein the forming the external electrode further includes forming a third layer on the second layer by using a plating method.

* * * * *